United States Patent [19]

Baron et al.

[11] Patent Number: 5,104,970

[45] Date of Patent: Apr. 14, 1992

[54] REACTIVE POLYIMIDES FOR ADDITION TO THERMOSETTING RESINS, AND PROCESS FOR PREPARATION OF SAME

[75] Inventors: Kenneth S. Baron, San Ramon; Joran Diamant, Moraga; Mounir M. Ghali, Dublin; Winston L. Hedges, Livermore, all of Calif.

[73] Assignee: Hexcel Corporation, Dublin, Calif.

[21] Appl. No.: 630,730

[22] Filed: Dec. 20, 1990

Related U.S. Application Data

[63] Continuation of Ser. No. 377,089, Jul. 7, 1989, abandoned.

[51] Int. Cl.$^5$ .................... C08G 69/26; C08G 63/06; C08F 6/00
[52] U.S. Cl. ................................... 528/353; 528/208; 528/489; 528/499
[58] Field of Search ............... 528/353, 208, 499, 489

[56] References Cited

U.S. PATENT DOCUMENTS

| | | | |
|---|---|---|---|
| 3,536,666 | 10/1970 | Berg | 528/208 |
| 3,856,752 | 12/1974 | Bateman et al. | 528/208 |
| 3,891,601 | 6/1975 | Peterson et al. | 528/208 |
| 3,988,303 | 10/1976 | Korshak et al. | 528/208 |
| 4,151,346 | 4/1979 | Sextro et al. | 528/499 |

FOREIGN PATENT DOCUMENTS 0147406  9/1983  Japan ................................ 528/499

*Primary Examiner*—John Kight, III
*Assistant Examiner*—T. Mosley
*Attorney, Agent, or Firm*—Oblon, Spivak, McClelland, Maier & Neustadt

[57] ABSTRACT

Thermoplastics containing imide groups in the polymer backbone, soluble in an unmodified state, are rendered reactive with thermosetting resins by partial conversion of the polymer backbone to provide reactive groups. The modified polymer may be added as microspheres to a thermosetting resin, subsequently crosslinking therewith supressing solvent sensitivity in a fiber reinforced matrix composite comprising the toughened resin as the matrix therefore. The modified polymer microspheres retain their physical identity in the cured composite structure.

9 Claims, No Drawings

REACTIVE POLYIMIDES FOR ADDITION TO THERMOSETTING RESINS, AND PROCESS FOR PREPARATION OF SAME

This application is a continuation of application Ser. No. 377,098 filed July 7, 1989, now abandoned.

BACKGROUND OF THE INVENTION

1. Field of the Invention

The invention pertains to thermoplastic polyimides that can be added to thermosetting resins to improve properties, the resulting resins, and a process for the preparation of the same.

2. Background of the Prior Art

Fiber reinforced matrix resin composite materials continue to receive close scrutiny and attention as high strength, light weight materials for a variety of critical applications, including but not limited to the aerospace field, involving both military and commercial applications. The peculiar characteristics of these composite materials, including good tensile strength, impact strength and compression strength, offer a unique opportunity to prepare high strength articles at significant weight savings. In general, the resin matrix surrounding the fiber reinforcement can be engineered to provide specific solvent resistance, physical properties and the like.

A increasingly high demands on physical properties are placed on these composite materials, particularly toughness properties, conventional resin systems cannot be directly, chemically modified without loss of significant, alternative properties. One particularly important class of resins used in the preparation of these composite materials are thermosetting resins, such as epoxy-based matrices. These resin systems can be toughened by the addition of a limited amount of thermoplastic toughening agent. One class of thermoplastic that is particularly desirable, both from the aspect of a toughening agent, and a flow control agent, for process controls is the polyimide class. However, some of these polyimides, such as ULTEM from General Electric and MATRIMID 5218, from Ciba Geigy, are particularly sensitive to a variety of solvents including commonly encountered solvents such as methylene chloride. Thus, the addition of such toughening agents may render the otherwise solvent-resistant thermosetting resin matrix/fiber composite sensitive to a variety of solvents, significantly reducing its value.

Accordingly, it remains an object of the industry to provide thermosetting resins which can be toughened, and provided a flow control agent, by the addition of a polyimide thermoplastic, without, imparting solvent sensitivity to the composite.

SUMMARY OF THE INVENTION

The above, and other objectives made clear below, are achieved by adding or creating reactive groups along the polyimide polymer backbone. This allows the polyimide to become lightly crosslinked with the thermosetting resin, e.g., epoxy, when mixed together. The polyimide may be recovered in the form of solid microspheres, which when added to the resin, may be added in localized fashion, to enhance site-specific toughness, as the microspheres maintain their separate identity although crosslinked in the final cured product. The reactive polyimide is prepared by dissolving an unmodified polyimide in an appropriate solvent, such as methylene chloride. A precise amount of an aqueous hydroxide solution, such as sodium or potassium hydroxide is added, along with a small amount of a phase transfer catalyst. This reaction mixture is heated at gentle reflux for a period of about 24 hours, then cooled to room temperature. The cooled reaction mixture is adjusted to a pH of from about 4–6.

To the above reaction mixture, containing the functionalized (partially hydrolyzed) polyimide, an aqueous solution of emulsifying agents is added. The mixture is placed in a high shear mixer, and emulsified. Application of a light vacuum and heat volatilizes the methylene chloride or other solvent, and removes it from the system. The methylene chloride, or other solvent, is trapped with a cold condenser. The remaining reactive polyimide is left as a suspension of solid microspheres in water. This suspension can be filtered, resuspended, refiltered and dried. The resulting filter cake may be mechanically broken, or sieved and classified as desired.

DETAILED DESCRIPTION OF THE INVENTION

The reactive polymer that is the subject of this invention is typically a polyimide, or a polymer in which at least a small percentage of the linkages in the polymer backbone are imide linkages, wherein a small percentage of the imide linkages along the polymer backbone can be hydrolyzed to provide amide-acid linkages. The carboxyl groups thus created are very reactive to a variety of conventional moieties present in thermosetting resins, in particular, the oxirane rings characterizing epoxy systems. Thus, upon mixture of the toughening agent with an epoxy-containing matrix, a covalent bond can form between the two thereby depressing solvent sensitivity which would otherwise be a serious drawback to the optimization of the system. A further advantage of this invention is that, whereas soluble polyimides have a marked tendency to dissolve in and migrate through a thermosetting resin during cure, the functionalized microspheres remain intact through the curing process. One particularly preferred polyimide, suitable as both a toughening agent and flow control agent is ULTEM, available from General electric. However, other suitable polyimides, such as MATRIMID 5218, available from Ciba Geigy, or other polyimides having a backbone wherein a portion of the imide linkages can be converted, can be used in the invention.

This invention may be further understood by reference to a typical example.

EXAMPLE

A typical procedure for the preparation of functionalized ULTEM and its subsequent conversion into microspheres is as follows:

A. Partial hydrolysis of ULTEM
   1) Into a 50 liter reactor is charged 20.0 liters (26.5 kg) of methylene chloride, 2.4 kg of ULTEM 1000, 82.6 ml of a 5.00 N aqueous solution of KOH, and 12.0 grams of tetrabutyl ammonium hydrogen sulfate (TBAS).
   2) This mixture is heated at gentle reflux for 24 hours.
   3) The mixture is cooled to room temperature.
   4) The cooled reaction mixture is acidified to a pH of 4–6 with acid.
   5) The mixture from part A is charged into a 10 gallon Ross mixer (high shear mixer) equipped with a vacuum system, low temperature condenser system (set for forward take-off of condensate) and receiving vessel, and fine-control heating system (preferably a circulating fluid/heat exchanger system).

B. Isolation of the reactive ULTEM as microsphere.
1) A solution of 320 grams of polyvinyl alcohol (3000 Mw/75% hydrolyzed) in 12.5 kg of water is prepared. After the polyvinyl alcohol is completely dissolved, 320 grams of glycerine are added to the solution.
2) The solution prepared in step 6 is charged into the Ross mixer containing the mixture from part A.
3) The anchor blade is started at 30% of maximum speed. (Actual speed may vary with the particular mixer being used.)
4) The homogenizer blade is started at 50% of maximum speed. (Actual speed may vary with the particular mixer being used).
5) The circulation of cooling fluid (at 0.0° C. or less) through the condenser (and receiving vessel jacket (if the receiving vessel is jacketed) is begun.
6) Four to six inches of vacuum is applied to the system. Once the vacuum is set, it is left constant for the remainder of the run.
7) The mixer vessel is heated using the circulating heat exchange fluid. The temperature of the heat exchange fluid should be kept 3° C. higher than the temperature of the contents of the mixer.
8) Methylene chloride will begin to vaporize from the mixer vessel, condense, and collect in the receiving vessel as the run proceeds. The vacuum must be held constant and the 3° C. temperature differential across the mixer skin should be maintained at all times. Once heating has been started even a small increase in vacuum will cause foaming of the system, as will a sudden rise in temperature.
9) When the temperature of the mixer contents reaches 45° C., the temperature of the mix is raised to a value sufficient to volatilize and remove substantially all the methylene chloride.
10) The mix contents are held at the elevated temperature (about 90°±2° C.) for one hour to ensure complete removal of the methylene chloride.
11) The mix is cooled to a temperature of 20°-25° C.
12) The contents of the mixer are filtered.
13) The filter cake is resuspended in five gallons of deionized water and then filtered again.
14) Step 13 is repeated.
15) The filter cake is dried in a forced air oven at 90°-100° C.
16) After drying, the filter cake may be broken up mechanically or, if desired, classified by sieving or by some other technique.

The above Example demonstrates the conversion of a portion of the imide linkages of the ULTEM polyimide to amide linkages with pendant carboxyl groups. Similar processes can be applied to other polyimides or imide containing polymers, the result being a toughening agent which is reactive with the epoxy, matrix to which it is added thereby decreasing the solvent sensitivity that would be induced if the polyimide were added directly, without modification. This modification may be illustrated as follows:

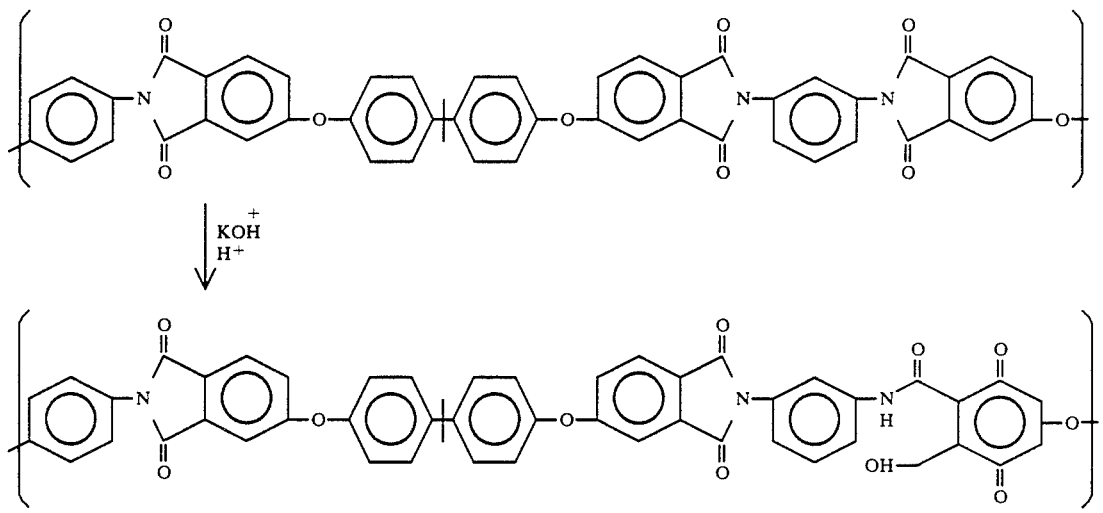

The above invention has been described both generally, and with respect to specific exemplification. Variation and alternation from the specific Examples presented, particularly with respect to the identity of the polyimide and suitable reactive materials, within the generalized description, will occur to those of ordinary skill in the art without the exercise of inventive faculty, and do not depart from the invention. In particular, products and processes exhibiting similar qualities through similar modifications are embraced by the inventive scope herein, save for the limitations presented by the claims appended hereto.

What is claimed is:

1. A process for the preparation of a thermoplastic polymer bearing reactive functional group on said polymer's backbone comprising dissolving a polymer containing at least some imide linkages in the polymer backbone in a solvent therefore, and adding to said solution an aqueous solution containing OH ions selected from the group consisting of aqueous sodium hydroxide and aqueous potassium hydroxide and a phase transfer catalyst, refluxing the resulting solution for a period of about 24 hours, cooling the refluxed solution to room temperature and acidifying the cooled solution of a pH of about 4–6 with acid, and recovering therefrom the polymer containing partially hydrolyzed imide linkages.

2. The process of claim 1, further comprising adding the acidified solution to a high shear mixing means, together with an aqueous solution of dispersing agents sufficient to provide a stabilized emulsion, applying a low degree of vacuum to the system while mixing said solution under high shear conditions, while heating, driving off and recovering the solvent from said mixing means, and cooling the resulting solution, filtering and washing the contents of the mixer, to recover microspheres of said polymer.

3. The process of claim 2, wherein said dispersing agents comprises polyvinyl alcohol and glycerine.

4. The process of claim 1, wherein said solvent comprises methylene chloride.

5. The process of claim 1, wherein said phase transfer catalyst comprises tetrabutyl ammonium hydrogen sulfate.

6. The process of claim 2, wherein said low degree of vacuum is about 4–6 inches of vacuum.

7. The process of claim 2, wherein said heating during mixing of said solution under high shear conditions is effected by use of a heat exchange fluid, which is maintained at a temperature of 3° C. higher than the temperature of the contents of the mixture.

8. The process of claim 2, wherein during said step of driving off and recovering the solvent, the solution is maintained at a temperature of about 90° C. for a period of about 1 hour, to ensure recovery of substantially all of said solvent.

9. The process of claim 2, wherein said mixed solution is cooled to a temperature of 20°–25° C.

* * * * *

UNITED STATES PATENT AND TRADEMARK OFFICE
CERTIFICATE OF CORRECTION

PATENT NO. : 5,104,970
DATED     : April 14, 1992
INVENTOR(S) : Kenneth S. Baron et al.

It is certified that error appears in the above-identified patent and that said Letters Patent is hereby corrected as shown below:

On the title page: Item [75]:
The second inventor's name is spelled incorrectly, should be, -- Joram Diamant--.

Signed and Sealed this

Tenth Day of August, 1993

Attest:

MICHAEL K. KIRK

Attesting Officer     Acting Commissioner of Patents and Trademarks